(12) United States Patent
Tani et al.

(10) Patent No.: US 10,190,231 B2
(45) Date of Patent: Jan. 29, 2019

(54) NI-PLATED STEEL SHEET, AND METHOD FOR PRODUCING NI-PLATED STEEL SHEET

(71) Applicant: NIPPON STEEL & SUMITOMO METAL CORPORATION, Tokyo (JP)

(72) Inventors: Yoshiaki Tani, Kitakyushu (JP); Shigeru Hirano, Kitakyushu (JP); Akira Tachiki, Kitakyushu (JP); Morio Yanagihara, Kitakyushu (JP); Makoto Kawabata, Kitakyushu (JP); Hirokazu Yokoya, Onga-gun (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 487 days.

(21) Appl. No.: 14/787,498

(22) PCT Filed: Apr. 30, 2014

(86) PCT No.: PCT/JP2014/061967
§ 371 (c)(1),
(2) Date: Oct. 28, 2015

(87) PCT Pub. No.: WO2014/178396
PCT Pub. Date: Nov. 6, 2014

(65) Prior Publication Data
US 2016/0102414 A1   Apr. 14, 2016

(30) Foreign Application Priority Data

Apr. 30, 2013   (JP) .................................. 2013-095785

(51) Int. Cl.
*B32B 15/01*   (2006.01)
*C25D 5/14*   (2006.01)
(Continued)

(52) U.S. Cl.
CPC .............. *C25D 5/14* (2013.01); *B32B 15/015* (2013.01); *C23C 28/021* (2013.01); *C25D 3/12* (2013.01);
(Continued)

(58) Field of Classification Search
None
See application file for complete search history.

(56) References Cited

U.S. PATENT DOCUMENTS 3,090,733 A * 5/1963 Brown ..................... C25D 5/14
                                                        205/176
4,501,802 A    2/1985 Higuchi et al.
(Continued)

FOREIGN PATENT DOCUMENTS

CN        1495291 A        5/2004
CN        101072675        11/2007
(Continued)

OTHER PUBLICATIONS

Korean Notice of Allowance, dated Jan. 13, 2017, for Korean Patent Application No. 10-2015-7030721 (with English translation).
(Continued)

*Primary Examiner* — Daniel J. Schleis
(74) *Attorney, Agent, or Firm* — Birch, Stewart, Kolasch & Birch, LLP

(57) ABSTRACT

A Ni-plated steel sheet according to the present invention includes a steel sheet, a first Ni-plated layer which is formed at least on a one-sided surface of the steel sheet and contains Ni, and a second Ni-plated layer which is formed on the first Ni-plated layer and contains Ni. An average central-line roughness Ra at an interface between the first Ni-plated layer and the second Ni-plated layer is less than 0.1 µm, an average central-line roughness Ra of a surface of the second Ni-plated layer is 0.1 µm to 100 µm, and a coating amount
(Continued)

of Ni in the entirety of the first Ni-plated layer and the second Ni-plated layer is 20 mg/m² to 2500 mg/m² per one-sided surface in terms of metal Ni.

9 Claims, 6 Drawing Sheets

(51) Int. Cl.
  *C25D 3/12*   (2006.01)
  *C25D 5/48*   (2006.01)
  *C23C 28/02*   (2006.01)
  *C25D 5/36*   (2006.01)
  *C25D 7/00*   (2006.01)
  *C25D 7/06*   (2006.01)
  *C25D 17/10*   (2006.01)

(52) U.S. Cl.
  CPC ............... *C25D 5/36* (2013.01); *C25D 5/48* (2013.01); *C25D 7/00* (2013.01); *C25D 7/0614* (2013.01); *C25D 17/10* (2013.01)

(56) References Cited

U.S. PATENT DOCUMENTS

| | | | |
|---|---|---|---|
| 8,795,846 B2* | 8/2014 | Minagi | C25D 3/12 205/181 |
| 2004/0018376 A1 | 1/2004 | Hamahara et al. | |
| 2010/0233506 A1 | 9/2010 | Tokuhara et al. | |
| 2013/0071688 A1 | 3/2013 | Bessho | |
| 2013/0209867 A1* | 8/2013 | Minagi | C25D 5/14 429/176 |

FOREIGN PATENT DOCUMENTS

| | | |
|---|---|---|
| CN | 101809695 A | 8/2010 |
| CN | 102906311 A | 1/2013 |
| EP | 0 163 048 A2 | 12/1985 |
| JP | 62-174397 A | 7/1987 |
| JP | 06-330375 | 11/1994 |
| JP | 11-106952 | 4/1999 |
| JP | 11-106954 | 4/1999 |
| JP | 2000-282289 A | 10/2000 |
| JP | 2007-231394 | 9/2007 |
| JP | 2007-284789 | 11/2007 |
| JP | 2009-099548 | 5/2009 |
| JP | 2009-235579 | 10/2009 |
| JP | 2013-007100 | 1/2013 |
| KR | 10-2012-0125547 A | 11/2012 |
| WO | WO 2012/153728 | 11/2012 |

OTHER PUBLICATIONS

International Search Report dated Jul. 22, 2014 issued in corresponding PCT Application No. PCT/JP2014/061967 [with English Translation].
Office Action dated Jun. 12, 2015 issued in Taiwanese Application No. 103115331 [with English Translation of Search Report].
Chinese Office Action and Search Report, dated Nov. 30, 2016, for Chinese Application No. 201480024785.4, together with an English translation thereof.
Extended Euroepan Search Report, dated Nov. 10, 2016, for European Application No. 14791986.3.

* cited by examiner

NI-PLATED STEEL SHEET, AND METHOD FOR PRODUCING NI-PLATED STEEL SHEET

TECHNICAL FIELD OF THE INVENTION

This application is a national stage application of International Application No. PCT/JP2014/061967, filed on Apr. 30, 2014, which claims priority to Japanese Patent Application No. 2013-95785, filed on Apr. 30, 2013, each of which is incorporated herein by reference in its entirety.

The present invention relates to a Ni-plated steel sheet and a method for producing a Ni-plated steel sheet.

RELATED ART

A steel sheet for a container, in which a chemical conversion treatment film containing various elements such as zirconium (Zr), phosphorous (P), chromium (Cr), titanium (Ti), manganese (Mn), and aluminum (Al) is formed on nickel (Ni) plating, has been used as one of a metal material in manufacturing a metal container for preservation of foods or beverages (for example, refer to Patent Document 1 to Patent Document 3). The Ni-plated steel sheet including the chemical conversion treatment film has excellent wettability due to the Ni-plating, and excellent adhesion with a film or a coating material due to the chemical conversion treatment film.

Patent Document 4 discloses a technology in which Ni strike plating is performed, and Ni plating is formed through a cleaning process, thereby raising the adhesion of the Ni-plating. The Ni-plated steel sheet is used as one of a frame material in a color cathode-ray tube and can exhibit excellent weldability due to the Ni plating and excellent plating adhesion due to the Ni strike plating.

PRIOR ART DOCUMENT

Patent Document

[Patent Document 1] Japanese Unexamined Patent Application, First Publication No. H11-106952
[Patent Document 2] Japanese Unexamined Patent Application, First Publication No. H11-106954
[Patent Document 3] Japanese Unexamined Patent Application, First Publication No. 2007-284789
[Patent Document 4] Japanese Unexamined Patent Application, First Publication No. H6-330375

DISCLOSURE OF THE INVENTION

Problems to be Solved by the Invention

However, the Ni-plated steel sheets disclosed in Patent Document 1 to Patent Document 3 are deficient in terms of corrosion resistance against highly corrosive contents such as an acidic beverage. Accordingly, the Ni-plated steel sheet is mainly used as a can material for weakly corrosive contents such as a body material for a three-piece welded can that is a beverage can, and there is a problem in that the Ni-plated steel sheet cannot be used as a can material for highly corrosive contents.

The Ni-plated steel sheet disclosed in Patent Document 4 uses Watts bath which is commonly known for formation of the Ni-plated layer. In the Ni plating using the Watts bath, even though the coating amount of Ni is increased, a dense film is not formed but only surface unevenness become coarse, and thus the corrosion resistance is not improved due to existence of a coating defect. In addition, Ni plating formed by a Watts bath which is not containing chloride ions is dense, but the surface unevenness is small and thus wettability tends to decrease.

As one of a method of improving the corrosion resistance of the Ni plating in the steel sheet for a container, a method of increasing the amount of the chemical conversion treatment film can be exemplified. However, a chemical conversion treatment with a compound of Zr, P, Cr, Ti, Mn, Al, and the like is an insulating chemical conversion treatment, and thus the wettability tends to decrease.

As described above, in the method of the related art, it is difficult to make the corrosion resistance and the wettability compatible with each other.

In addition, in the steel sheet for a container, in the case of increasing the amount of the Ni plating or the chemical conversion treatment film, there is a problem in that the manufacturing cost increases.

Accordingly, there is demand for a Ni-plated steel sheet having corrosion resistance which can be used for flighty corrosive contents and wettability during can manufacturing, and which is highly cost effective.

Accordingly, the present invention has been made in consideration of the above-described problems, and an object thereof is to provide a Ni-plated steel sheet which has excellent corrosion resistance and wettability and is highly cost effective, and a method of producing a Ni-plated steel sheet.

Means for Solving the Problem

The present invention has been made to accomplish the above-described object, and the gist thereof is as follows.

(1) According to a first aspect of the present invention, there is provided a Ni-plated steel sheet including a steel sheet, a first Ni-plated layer which is formed at least on a one-sided surface of the steel sheet and contains Ni, and a second Ni-plated layer which is formed on the first Ni-plated layer and contains Ni. An average central-line roughness Ra at an interface between the first Ni-plated layer and the second Ni-plated layer is less than 0.1 µm, an average central-line roughness Ra of a surface of the second Ni-plated layer is 0.1 µm to 100 µm, and a coating amount of Ni in an entirety of the first Ni-plated layer and the second Ni-plated layer is 20 mg/m$^2$ to 2500 mg/m$^2$ per one-sided surface in terms of metal Ni.

(2) In the Ni-plated steel sheet according to (1), an amount of chlorine in the first Ni-plated layer may be 0 ppm to 100 ppm.

(3) In the Ni-plated steel sheet according to (1) or (2), a coating amount of Ni in the first Ni-plated layer may be 15 mg/m$^2$ to 2000 mg/m$^2$ per one-sided surface in terms of metal Ni, and a coating amount of Ni in the second Ni-plated layer may be 5 mg/m$^2$ to 500 mg/m$^2$ per one-sided surface in terms of metal Ni.

(4) The Ni-plated steel sheet according to any one of (1) to (3) may further include a chemical conversion treatment film layer, which contains at least one of a chromium oxide, a zirconium compound, a phosphate compound, a titanium oxide, an aluminum oxide, and a manganese oxide, on the second Ni-plated layer.

(5) In the Ni-plated steel sheet according to any one of (1) to (4), the coating amount of Ni may be 400 mg/m$^2$ to 1000 mg/m$^2$ per one-sided surface in terms of metal Ni.

(6) In the Ni-plated steel sheet according to any one of (1) to (5), the coating amount of Ni in the first Ni-plated layer may be 300 mg/m² to 800 mg/m² per one-sided surface in terms of metal Ni, and the coating amount of Ni in the second Ni-plated layer may be 100 mg/m² to 200 mg/m² per one-sided surface in terms of metal Ni.

(7) In the Ni-plated steel sheet according to any one of (1) to (6), a surface of the second Ni-plated layer may have unevenness in which a height difference in a thickness direction of the steel sheet is 1 μm to 10 μm.

(8) According to a second aspect of the present invention, there is provided a method for producing a Ni-plated steel sheet. The method includes a first plating process of subjecting a steel sheet to an electrolysis treatment in a first Ni-plating bath containing 5 g/L to 60 g/L of Ni ions, 20 g/L to 300 g/L of sulfate ions, 10 g/L to 60 g/L of borate ions, and less than 0.5 g/L of chloride ions to form a first Ni-plated layer on the steel sheet, and a second plating process of subjecting the steel sheet, on which the first Ni-plated layer is formed, to an electrolysis treatment in a second Ni-plating bath containing 5 g/L to 60 g/L of Ni ions, 20 g/L to 300 g/L of sulfate ions, 10 g/L to 60 g/L of borate ions, and 10 g/L to 60 g/L of chloride ions to form a second Ni-plated layer on the first Ni-plated layer. A temperature of the first Ni-plating bath and a temperature of the second Ni-plating bath are equal to or higher than 10° C. and lower than 90° C., and in the first plating process and the second plating process, the electrolysis treatment is performed at a current density of 1.0 A/dm² to 100 A/dm² for an electrolysis treatment time of 0.2 seconds to 150 seconds.

(9) In the method for producing a Ni-plated steel sheet according to (8), a rinsing process may not be provided between the first plating process and the second plating process.

Effects of the Invention

According to the above-described aspects, it is possible to provide a Ni-plated steel sheet which has more excellent corrosion resistance and wettability and is highly cost effective by forming two kinds of Ni-plated layers on a surface of a steel sheet.

EMBODIMENT OF THE INVENTION

Figure 1A:
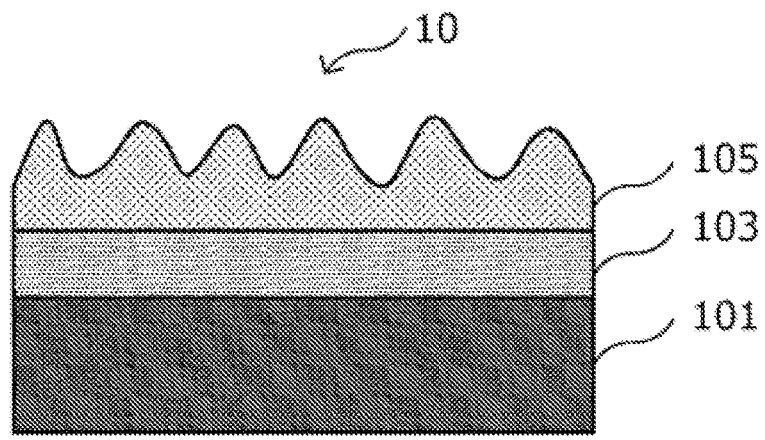
FIG. 1A is a view schematically illustrating a Ni-plated steel sheet according to an embodiment of the invention.

Hereinafter, a Ni-plated steel sheet and a method for producing a Ni-plated steel sheet according to an embodiment of the invention will be described in detail with reference to the accompanying drawings. In addition, in this specification and the drawings, the same reference numeral is given to constituent elements having substantially the same functional configuration, and redundant description thereof will not be repeated.

(With Respect to Configuration of Ni-Plated Steel Sheet)

First, a configuration of a Ni-plated steel sheet according to this embodiment of the invention will be described in detail with reference to FIG. 1A to FIG. 2B. FIG. 1A to FIG. 2B are views schematically illustrating a configuration of the Ni-plated steel sheet according to this embodiment when viewed from a lateral side.

Figure 1B:
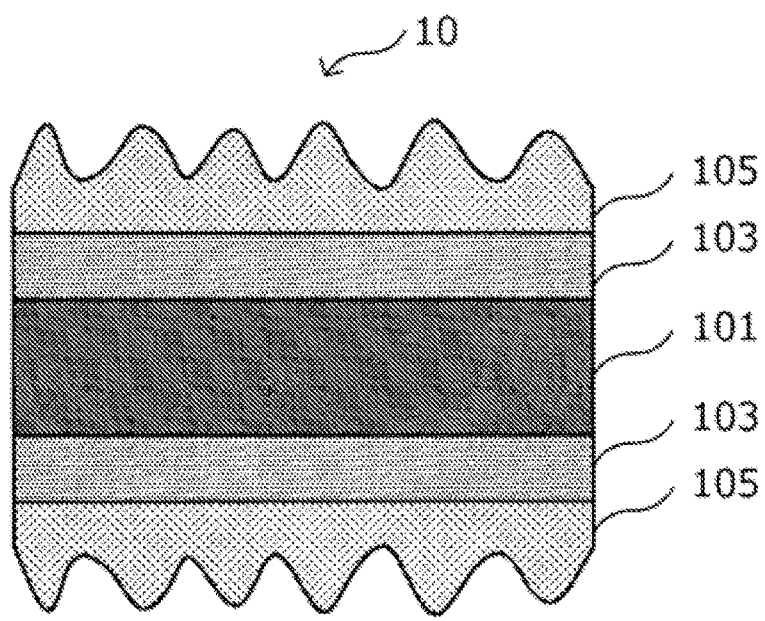
FIG. 1B is a view schematically illustrating the Ni-plated steel sheet according to the embodiment.

As shown in FIG. 1A and FIG. 1B, a Ni-plated steel sheet 10 according to this embodiment includes a steel sheet 101, a first Ni-plated layer 103, and a second Ni-plated layer 105. The first Ni-plated layer 103 and the second Ni-plated layer 105 be formed on a surface on only one side of the steel sheet 101 as shown in FIG. 1A, or may be formed on the two surfaces of the steel sheet 101 which are opposite to each other as shown in FIG. 1B.

(With Respect to Steel Sheet 101)

The steel sheet 101 is used as a base metal of the Ni-plated steel sheet 10 to this embodiment. There is no particular limitation to the steel sheet 101 is used in this embodiment, and typically, a known steel sheet, which is used as a container material, can be used. There is also no particular limitation to a production method or a material quality of the known steel sheet as long as the known steel sheet is produced by typical method through known processes such as casting, hot-rolling, pickling, cold-rolling, annealing, and temper rolling. In addition, there is no particular limitation to the surface roughness of the steel sheet 101 as long as the surface roughness is in a range of surface roughness of a typical steel sheet that is produced through the above-described processes.

(With Respect to First Ni-Plated Layer 103)

As shown in FIG. 1A and FIG. 1B, the first Ni-plated layer 103 is formed on a surface of the steel sheet 101. The first Ni-plated layer 103 is an insoluble Ni-plated layer which contains Ni (Ni is set as a main component). As a nickel electroplating bath, a Watts bath, which contains Ni ions, sulfate ions, chloride ions, and borate ions as a main component, is well known, but the first Ni-plated layer 103 is formed by using a bath obtained by excluding the chloride ions from the Watts bath. Accordingly, the first Ni-plated layer 103 becomes a Ni-plated layer that does not contain chlorine (Cl). However, the chloride ions may be contained in the plating bath in an amount of less than 0.5 g/L. In this case, the first Ni-plated layer contains chlorine, but when the amount of chlorine in the first Ni-plated layer is 100 ppm or less, there is no influence on the corrosion resistance and the wettability of the Ni-plated steel sheet.

The first Ni-plated layer 103, which is formed by using the Ni plating bath, has a very dense surface and excellent corrosion resistance derived from the dense surface. Surface roughness of the first Ni-plated layer 103 (in other words, roughness at an interface between the first Ni-plated layer 103 and the second Ni-plated layer 105 be described later) is less than 0.1 μm in terms of average central-line roughness Ra.

In a case where the surface roughness Ra of the first Ni-plated layer 103 is 0.1 or greater, it is difficult to obtain corrosion resistance capable of withstanding highly corrosive contents, and thus this range is not preferable. In addition, the smaller a value of the surface roughness Ra of the first Ni-plated layer 103, the more excellent the corrosion resistance, and thus the lower limit of the surface roughness Ra is not particularly limited. However, a measurement limit in an apparatus of measuring the average central-line roughness Ra is approximately 10 nm, and it is difficult to measure surface roughness Ra that is lower than the measurement limit. According to this, the lower limit of the surface roughness Ra of the first Ni-plated layer 103 may be set to approximately 10 nm from the viewpoint of the measurement limit.

(With Respect to Second Ni-Plated Layer 105)

As shown in FIG. 1A and FIG. 1B, the second Ni-plated layer 105 is formed on the first Ni-plated layer 103. The second Ni-plated layer 105 is a soluble Ni-plated layer that contains Ni (Ni is set as a main component). The second Ni-plated layer 105 is formed by using a so-called Watts bath that contains Ni ions, sulfate ions, chloride ions, and borate ions as a main component. Accordingly, unlike the first Ni-plated layer 103, the second Ni-plated layer 105 becomes a Ni-plated layer that contains chlorine.

Figure 3:
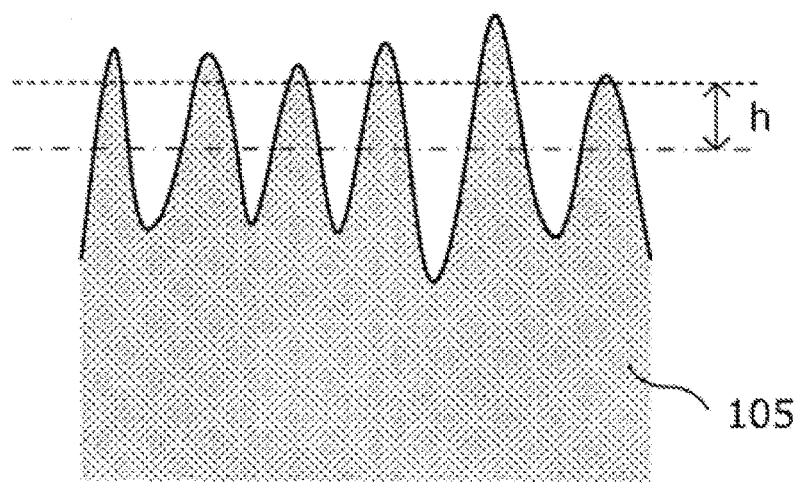
FIG. 3 is a view schematically illustrating the Ni-plated steel sheet according to the embodiment.

As shown in FIG. 3, a surface of the second Ni-plated layer 105, which is formed by using the Watts bath, has unevenness in which an average height h of each unevenness is 0.1 µm to 100 µm (that is, unevenness in which average central-line roughness Ra is 0.1 µm to 100 µm). The unevenness becomes a starting point of electrification during welding, and thus when the second Ni-plated layer 105 is provided, it is possible to realize satisfactory wettability.

In a case where the unevenness is less than 0.1 µm, the surface of the second Ni-plated layer 105 becomes too flat, and thus the wettability decreases. Accordingly, this case is not preferable. In addition, in a case where the unevenness exceeds 100 µm, irregularity occurs in the external appearance, and thus this case is not preferable. The unevenness of the surface of the second Ni-plated layer 105 (average height difference in a thickness direction of the steel sheet) is more preferably 1 µm to 10 µm.

As described above, in the Ni-plated steel sheet 10 according to this embodiment, the first Ni-plated layer 103 having a dense and flat surface is provided on a surface side of the steel sheet 101, and thus excellent corrosion resistance is realized, and excellent wettability is realized due to the second Ni-plated layer 105 having a surface which has large unevenness. According to this, even when surface roughness of the steel sheet 101 is approximately 0.1 µm to 5 µm, an unevenness portion of the second Ni-plated layer 105 at a portion, in which the roughness of the steel sheet 101 is the highest, exhibits satisfactory electrification properties during welding, and thus it is possible to maintain wettability. In addition, even when the surface roughness of the steel sheet 101 is approximately 0.1 µm to 5 µm, the first Ni-plated layer 103, which is formed as a lower layer of the second Ni-plated layer 105, can maintain excellent corrosion resistance. Accordingly, in the Ni-plated steel sheet 10 according to this embodiment, it is possible to realize excellent corrosion resistance and wettability without depending on the surface roughness of the steel sheet 101.

(With Respect to Coating Amount of Ni)

In the Ni-plated steel sheet 10 according to this embodiment, the coating amount of Ni in the entirety of the first Ni-plated layer 103 and the second Ni-plated layer 105 is 20 mg/m² to 2500 mg/m² per one-sided surface in terms of metal Ni. In a case where the coating amount of Ni is less than 20 mg/m², it is difficult to realize the corrosion resistance and the wettability as described above, and thus this case in not preferable. In addition, in a case where the coating amount of Ni exceeds 2500 mg/m², the corrosion resistance and the wettability as described above are saturated, and thus this case is not preferable from the economical viewpoint.

Particularly, in a combination in which the coating amount of Ni in the first Ni-plated layer is 15 mg/m² to 2000 mg/m² per one-sided surface in terms of metal Ni, and the coating amount of Ni in the second Ni-plated layer is 5 mg/m² to 500 mg/m² per one-skied surface in terms of metal Ni excellent corrosion resistance and wettability can be realized.

Furthermore, when the coating amount of Ni in the entirety of the first Ni-plated layer 103 and the second Ni-plated layer 105 is set to 400 mg/m² to 1000 mg/m² per one-sided surface in terms of metal Ni a more preferable result is obtained. In this case, when combination is made in such a manner that the coating amount of Ni in the first Ni-plated layer becomes 300 mg/m² to 800 mg/m², and the coating amount of Ni in the second Ni-plated layer becomes 100 mg/m² to 200 mg/m², it is possible to realize the Ni-plated steel sheet that is highly cost effective while maintaining the corrosion resistance and wettability as described above.

(With Respect to Chemical Conversion Treatment Film Layer 107)

Figure 2A:
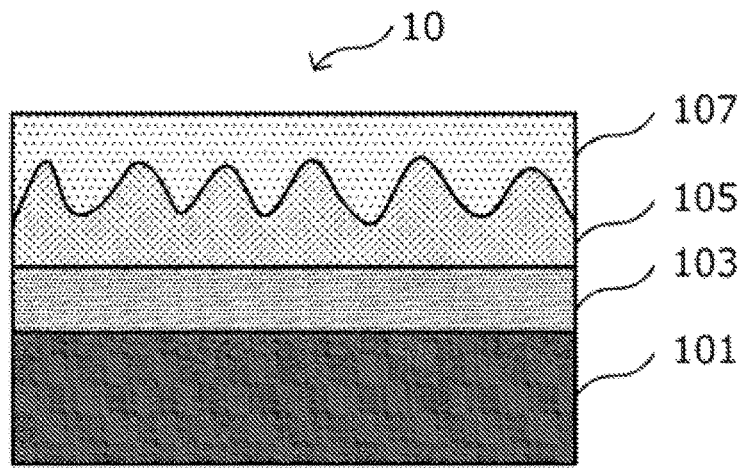
FIG. 2A is a view schematically illustrating the Ni-plated steel sheet according to the embodiment.
Figure 2B:
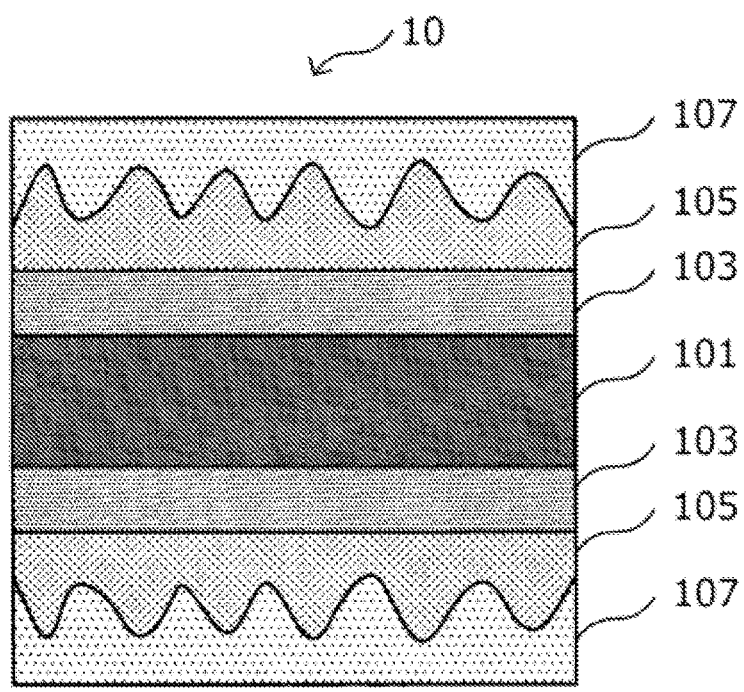
FIG. 2B is a view schematically illustrating the Ni-plated steel sheet according to the embodiment.

For example, as shown in FIG. 2A and FIG. 2B, the Ni-plated steel sheet 10 according to this embodiment may further include a chemical conversion treatment film layer 107 on the second Ni-plated layer 105. It is preferable that the chemical conversion treatment film layer 107 contains at least one of a chromium oxide, a zirconium compound, a phosphate compound, a titanium oxide, an aluminum oxide, and a manganese oxide. There is no particular limitation to a method of forming the chemical conversion treatment film layer 107, and it is possible to use known methods such as an immersion treatment in a treatment solution, an electrolysis treatment using a treatment solution, and a coating treatment using a treatment solution in accordance with a compound that is used.

In the following description, as a specific example of the chemical conversion treatment film layer 107, a case of forming the chemical conversion treatment film layer 107 by using a Zr compound, and a case of forming the chemical conversion treatment film layer 107 by using a Cr oxide will be described briefly.

For example, in the case of forming the chemical conversion treatment film layer 107 by using the Zr compound, an acidic solution, in which Zr ions and fluoride ions are dissolved, is used. In the acidic solution, phosphate ions, a phenol resin, and the like may be dissolved as necessary. It is possible to form the chemical conversion treatment film layer 107 that contains the Zr compound (more specifically, a Zr oxide), or the chemical conversion treatment film layer 107 that contains the Zr oxide and the Zr phosphate compound through immersion of the steel sheet in the acidic solution, or an cathode electrolysis treatment using the acidic solution.

For example, in the case of forming the chemical conversion treatment film layer 107 by using the Cr oxide, an aqueous solution, in which chromates such as a sodium salt of chromic acid, a potassium salt, an ammonium salt, and the like of a chromic acid are dissolved, is used. In the aqueous solution, sulfate ions or fluoride ions may be dissolved as necessary. It is possible to form the chemical conversion treatment film layer 107 that contains the Cr oxide through immersion of the steel sheet in the aqueous solution, or a cathode electrolysis treatment using the aqueous solution.

When the chemical conversion treatment film layer 107 as described above is further formed on the second Ni-plated layer 105, it is possible to further improve the corrosion resistance of the Ni-plated steel sheet 10. In addition, in a case where a film layer or a coating layer is further formed on the outermost surface of the Ni-plated steel sheet 10, when the chemical conversion treatment film layer 107 is formed, it is possible to improve adhesion between the film or the coating material and the Ni-plated steel sheet 10.

In addition, a coating amount of the chemical conversion treatment film layer 107 is not particularly limited, and may be appropriately determined, in accordance with a compound that is used. For example, as a preferable coating amount, 1 mg/m$^2$ to 150 mg/m$^2$ can be exemplified.

A known treatment agent such as an anti-rust oil may be applied to an upper layer of the chemical conversion treatment film layer 107 as necessary. In addition, instead of the chemical conversion treatment film layer 107, a plated layer using a metal such as Ti, Al, manganese (Mn), and tungsten (W) may be further formed on the second Ni-plated layer 105.

(With Respect to Method of Measuring Surface State of Ni-Plated Layer)

Next, a method of measuring a surface state of each of the Ni-plated layers will be described.

The surface roughness of the first Ni-plated layer 103 can be measured by using a known surface roughness measuring device when the steel sheet passes through the first Ni-plating bath that is used to form the first Ni-plated layer 103. Here, it is necessary for the known surface roughness measuring device to have resolution of 0.1 μm or less with respect to the central-line roughness Ra.

Even after the second Ni-plated layer 105 is formed, it is possible to measure the surface roughness of the first Ni-plated layer 103 by a method to be described below. That is, in the Ni-plated steel sheet 10 according to this embodiment, the first Ni-plated layer 103 does not contain chlorine, and the second Ni-plated layer 105 chlorine. Accordingly, it is possible to specify an interface between the first Ni-plated layer 103 and the second Ni-plated layer 105 by analyzing a chlorine distribution on a cross-section of a Ni-plated layer by using an analyzer such as a cylindrical mirror analyzer (CMA), an electron probe microanalyser (EPMA), and an X-Ray fluorescence spectrometer (XRF). Thus, it is possible to measure the surface roughness of the interface that is specified by using a known method.

The surface state (unevenness) of the second Ni-plated layer 105 can be measured by using a known surface roughness measuring device. Here, it is necessary for the known surface roughness measuring device to have resolution of 0.1 μm to 100 μm with respect to the central-line roughness Ra.

(With Respect to Method for Measuring Coating Amount of Ni)

Next, a method of measuring a coating amount of Ni in the first Ni-plated layer 103 and the second Ni-plated layer 105 will be described.

The coating amount of Ni (amount in terms of metal Ni) can be measured, for example, by a fluorescent X-ray method. In this case, a calibration curve illustrating a correlation between the amount in terms of metal Ni and fluorescent X-ray intensity is specified in advance by using a sample of the coating amount of Ni in which the coating amount of Ni is already known, and the amount in terms of metal Ni can be specified by using the calibration curve relatively.

In addition, the method of measuring the coating amount of Ni (amount in terms of metal Ni) is not limited to the above-described method, and other known measuring methods are applicable.

Hereinbefore, the configuration of the Ni-plated steel sheet 10 according to this embodiment has been described in detail with reference to FIG. 1A to FIG. 3.

(With Respect to Method for Producing Ni-Plated Steel Sheet)

Figure 4:
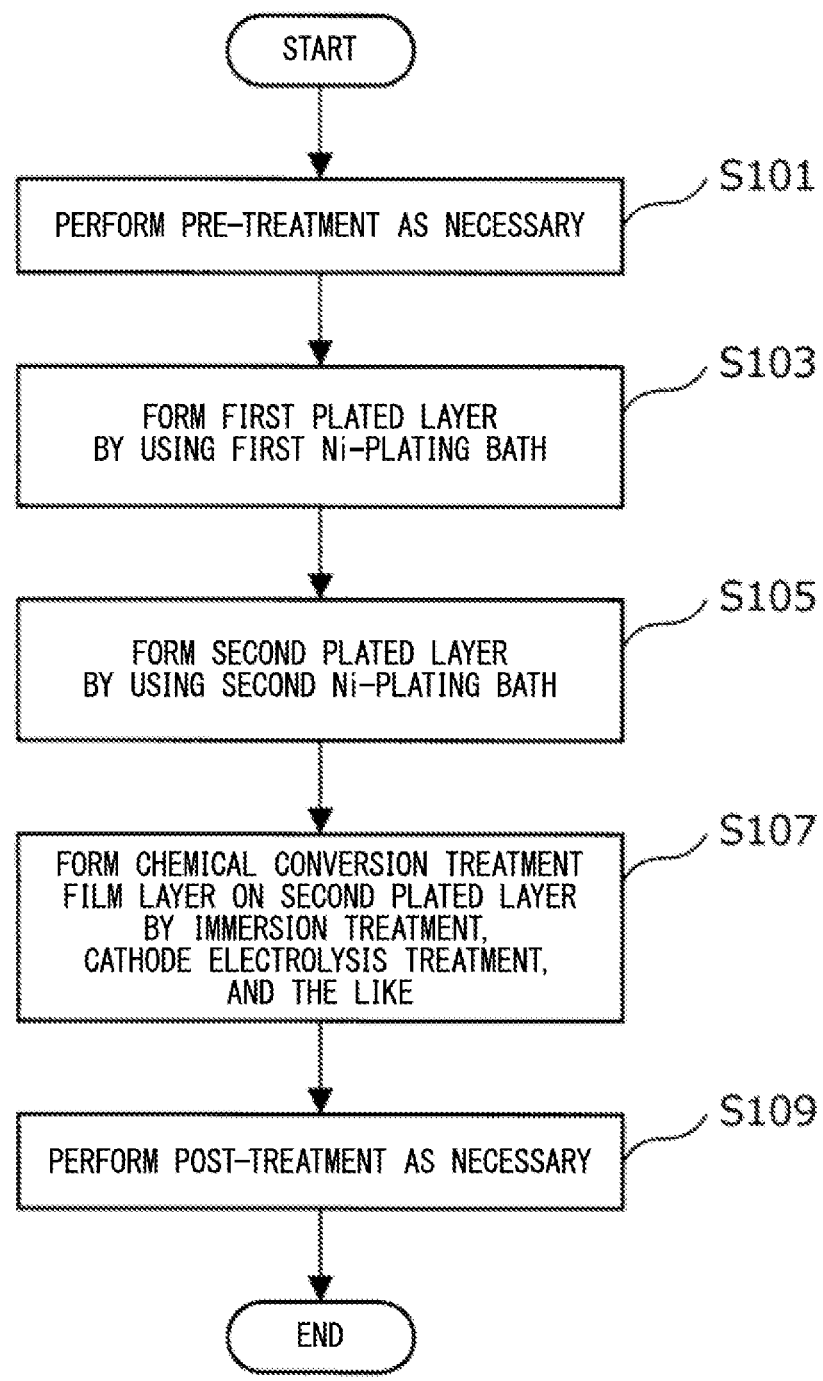
FIG. 4 is a flowchart illustrating an example of a flow of a method for producing the Ni-plated steel sheet according to the embodiment.
Figure 5A:
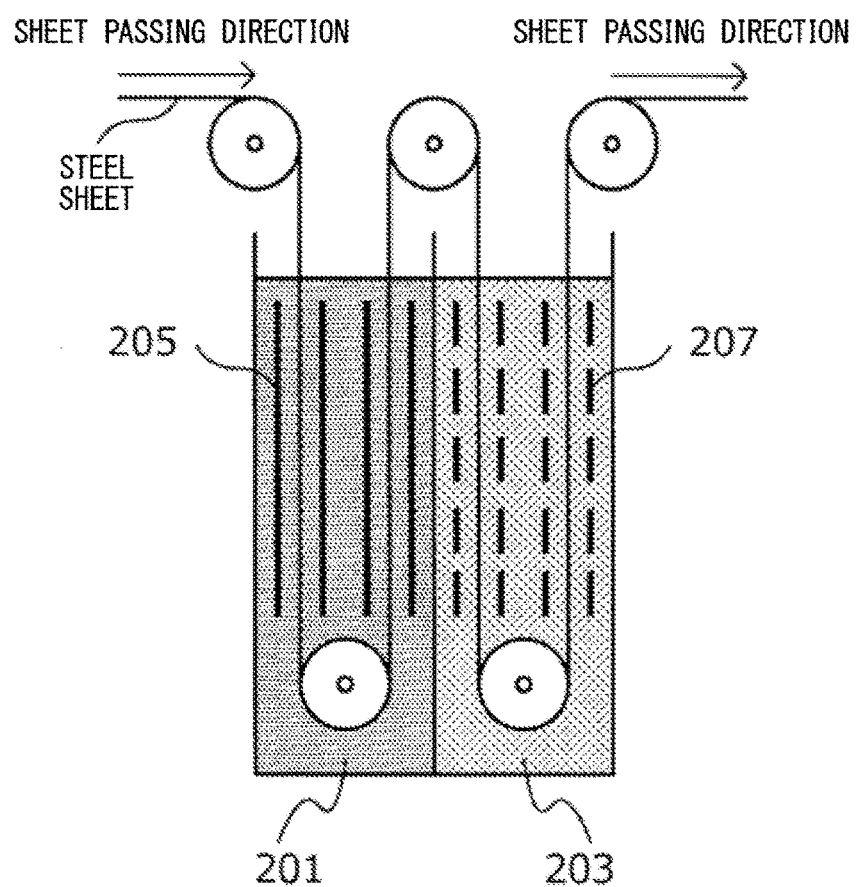
FIG. 5A is a view illustrating the method for producing the Ni-plated steel sheet according to the embodiment.
Figure 5B:
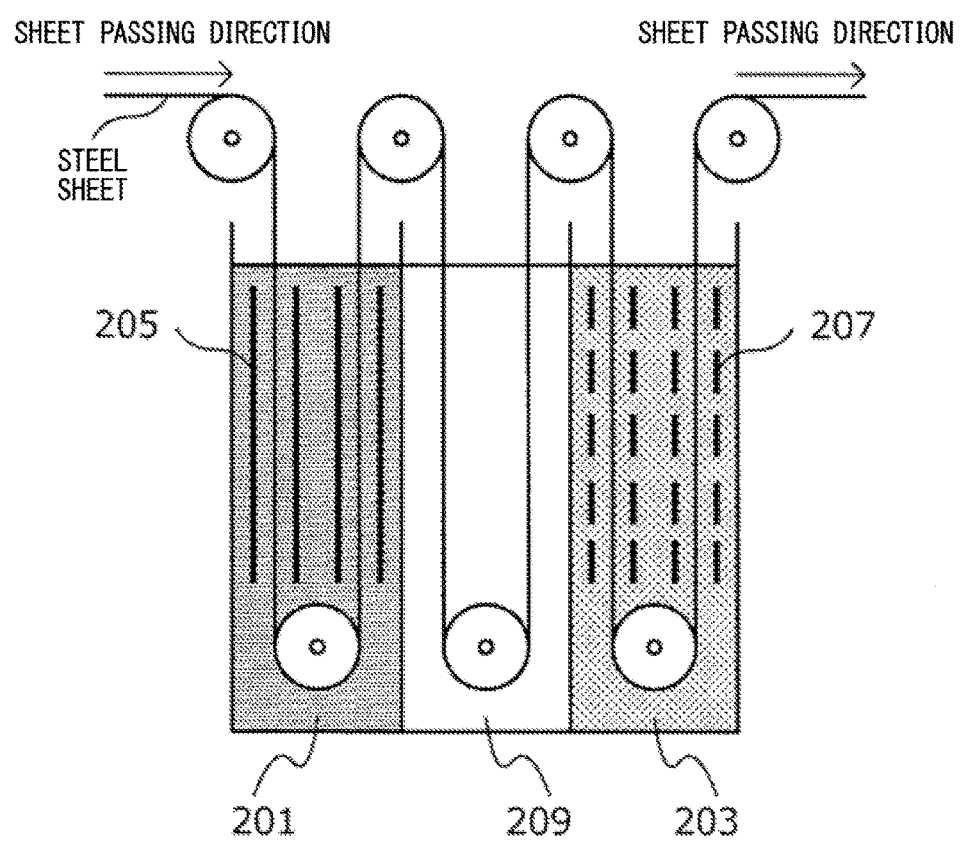
FIG. 5B is a view illustrating the method for producing the Ni-plated steel sheet according to the embodiment.

Next, a method for producing the Ni-plated steel sheet 10 according to this embodiment will be described in detail with reference to FIG. 4 to FIG. 5B. FIG. 4 is a flowchart illustrating an example of a flow of the method for producing the Ni-plated steel sheet according to this embodiment, and FIG. 5A and FIG. 5B are views illustrating the method for producing the Ni-plated steel sheet according to this embodiment.

First, an overall flow of the method for producing the Ni-plated steel sheet 10 will be described with reference to FIG. 4.

In the method for producing the Ni-plated steel sheet 10 according to this embodiment, first, a pre-treatment is performed as necessary (step S101). That is, oil, a scale, and the like may be attached to a surface of the steel sheet 101 in dependence on the steel sheet that is used as a base metal. Accordingly, a pre-treatment such as a cleaning treatment of removing the oil or the scale on the steel sheet 101 is performed prior to a Ni plating treatment to be described below.

Then, the first Ni-plated layer 103 is formed on the surface of the steel sheet through an electrolysis plating treatment using the first Ni-plating bath (step S103). Continuously, the second plated layer 105 is formed on the first Ni-plated layer 103 through an electrolysis plating treatment using the second Ni-plating bath (step S105). Details of components of each of the Ni-plating baths or details of the electrolysis plating treatments will be described below in detail.

After the two Ni-plated layers are formed on the steel sheet 101, the chemical conversion treatment film layer 107 is formed on the second Ni-plated layer 105 by using a known method (step S107).

Then, a post-treatment is performed with respect to the Ni-plated steel sheet 10, which is produced, as necessary (step S109). Although not particularly limited, examples of the post-treatment include a treatment of applying an anti-rust oil on a surface of the Ni-plated steel sheet 10.

When performing the treatments in this order, the Ni-plated steel sheet 10 according to this embodiment is produced.

In addition, in the above description, description has been given of the flow in the case of forming the chemical conversion treatment film layer 107 on the second Ni-plated layer 105, but in a case of not forming the chemical conversion treatment film layer 107, it is needless to say that step S107 as described above may be omitted.

(With Respect to Electrolysis Plating Treatment Using Ni-Plating Bath)

Next, an electrolysis plating treatment using two kinds of Ni-plating baths will be described in detail with reference to FIG. 5A and FIG. 5B.

As described above, in the method for producing the Ni-plated steel sheet 10 according to this embodiment, two kinds of Ni-plating baths including the first Ni-plating bath that is used when forming the first Ni-plated layer 103, and the second Ni-plating bath that is used when forming the second Ni-plated layer 105 are used. In a production line for the Ni-plated steel sheet according to this embodiment, for example, as shown in FIG. 5A, a first Ni-plating bath 201 is provided on an upstream side in a steel sheet passing direction, and a second Ni-plating bath 203 is provided subsequent the first Ni-plating bath 201.

The first Ni-plating bath 201 is a Ni-plating bath that is used to form the first Ni-plated layer 103, which is dense and has excellent corrosion resistance, on the surface of the steel sheet 101 through insoluble Ni plating. The first Ni-plating bath 201 contains 5 g/L to 60 g/L of Ni ions, 20 g/L to 300 g/L of sulfate ions, 10 g/L to 60 g/L of borate ions, and unavoidable impurities. As is clear from the bath components, chloride ions are not added to the first Ni-plating bath 201. In addition, a plating solution is prepared by using a solvent such as ion exchanged water that does not contain chloride ions so as to prevent the chloride ions from being mixed in the plating bath 201. However, the chloride ions may be contained in the plating bath as long as the chloride ions are contained in an amount of less than 0.5 g/L.

In addition, electrodes 205, which are used for the electrolysis plating treatment, are provided in the first Ni-plating bath 201 with the passing steel sheet interposed therebetween. As each of the electrodes 205, for example, it is preferable to use an insoluble electrode such as a titanium (Ti)-platinum (Pt) electrode, a lead dioxide ($PbO_2$) electrode, and a lead (Pb)-tin (Sn)-silver (Ag) electrode rather than a Ni anode electrode.

The insoluble electrode is excellent when considering that uniformity in Ni plating is further improved in comparison to the Ni anode electrode. In the case of using the Ni anode electrode for the electrolysis plating treatment, there is a concern that a relatively large Ni lump will be separated ii the bath during electrolysis, and interposed between a sink roll and the steel sheet, thereby causing a pressed flaw. Particularly, a dense and smooth surface is demanded in the formation of the first Ni-plated layer, and thus this pressed flaw becomes a fatal error in terms of quality. On the other hand, there is no concern relating to the pressed flaw in the insoluble electrode, and Ni ions can be allowed to be present in the bath in an approximately uniform manner, and thus uniform plating having excellent corrosion resistance tends to be formed.

For example, a bath temperature of the first Ni-plating bath 201 is set to be equal to or higher than 10° C. and lower than 90° C. In a case where the bath temperature is lower than 10° C., an efficiency of Ni adhesion deteriorates, and thus this case is not preferable. In addition, in a case where the bath temperature is 90° C. or higher, unevenness in the Ni plating is not uniform, and thus this case is not preferable. The bath temperature of the first Ni-plating bath 201 is more preferably equal to or higher than 20° C. and lower than 30° C.

In addition, in the first Ni-plating bath 201, the electrolysis plating treatment is performed under conditions of a current density of 1.0 $A/dm^2$ to 100 $A/dm^2$ and an electrolysis treatment time of 0.2 seconds to 150 seconds.

In a case where the current density is less than 1.0 $A/dm^2$, the efficiency of Ni adhesion deteriorates, and thus this case is not preferable. On the other hand, in a case where the current density exceeds 100 $A/dm^2$, unevenness in the Ni plating is not uniform, and thus this case is not preferable. The current density of the first Ni-plating bath 201 is more preferably 5 $A/dm^2$ to 10 $A/dm^2$.

In addition, in a case where the electrolysis treatment time is shorter than 0.2 seconds, it is difficult to obtain the coating amount of Ni that is necessary, and thus this case is not preferable. On the other hand, in a case where the electrolysis treatment time exceeds 150 seconds, the coating amount of Ni becomes excessive, and thus this case is not preferable. The electrolysis treatment time in the first Ni-plating bath 201 more preferably 0.3 seconds to 50 seconds, and still more preferably 0.5 seconds to 6 seconds.

The second Ni-plating bath 203 is a Ni-plating bath that is used to form the second Ni-plated layer 105, which has greater unevenness, on the surface of the first Ni-plated layer 103 through soluble Ni plating. The second Ni-plating bath 203 contains 5 g/L to 60 g/L of Ni ions, 20 g/L to 300 g/L of sulfate ions, 10 g/L to 60 g/L of borate ions, 10 g/L to 60 g/L of chloride ions, and unavoidable impurities. When the chloride ions are present in the Ni-plating bath at the above-described concentration, the chloride ions are coordinated with the Ni ions which are present in the bath to form a complex. When this complex is formed, chlorine is also mixed in a plated layer that is formed, and thus the second Ni-plated layer 105 that is formed becomes a plated layer that contains chlorine. In addition, when the complex is formed, the chlorine ions, which are contained in the complex during electrolysis, block uniform formation of the Ni plating. Accordingly, large unevenness which brings an excellent wettability is formed in the second Ni-plated layer 105 that is formed.

In addition, electrodes 207, which are used for the electrolysis plating treatment, are provided in the second Ni-plating bath 203 with the passing steel sheet interposed therebetween. As is the case with the electrode 205 in the first Ni-plating bath 201, an insoluble electrode such as a Ti—Pt electrode can be used as each of the electrodes 207. However, in the case of using the insoluble electrode such as the Ti—Pt electrode, a chlorine gas that is harmful to the human body is generated due to a reaction of $2Cl^- \rightarrow Cl_2 + e^-$ in the vicinity of the electrode, and thus it is necessary to provide an exhaust facility for exhaust of the chlorine gas. Accordingly, in the second Ni-plating bath 203, it is preferable to use a Ni anode electrode as the electrode 207. In the case of using the Ni anode electrode, Ni ions are eluted due to a reaction of $Ni \rightarrow Ni^{2+} + 2e^-$. In this case, the chlorine gas is not generated, and thus it is not necessary to provide the exhaust facility.

For example, a bath temperature of the second Ni-plating bath 203 is set to be equal to or higher than 10° C. and lower than 90° C. In a case where the bath temperature is lower than 10° C., an efficiency of Ni adhesion deteriorates, and thus this case is not preferable. In addition, in a case where the bath temperature is 90° C. or higher, unevenness in the Ni plating is not uniform, and thus this case is not preferable. The bath temperature of the second Ni-plating bath 203 is more preferably equal to or higher than 70° C. and lower than 80° C.

In addition, in the second Ni-plating bath 203, the electrolysis plating treatment is performed under conditions of a current density of 1.0 $A/dm^2$ to 100 $A/dm^2$ and an electrolysis treatment time of 0.2 seconds to 150 seconds.

In a case where the current density is less than 1.0 $A/dm^2$, the efficiency of Ni adhesion deteriorates, and thus this case is not preferable. On the other hand, in a case where the current density exceeds 100 $A/dm^2$, unevenness in the Ni plating is not uniform, and thus this case is not preferable. The current density of the second Ni-plating bath 203 is more preferably 60 $A/dm^2$ to 70 $A/dm^2$.

In addition, in a case where the electrolysis treatment time is shorter than 0.2 second, it is difficult to obtain the coating amount of Ni that is necessary, and thus this case is not preferable. On the other hand, in a case where the electrolysis treatment time exceeds 150 seconds, the coating amount of Ni becomes excessive, and thus this case is not preferable. The electrolysis treatment time in the second Ni-plating bath 203 is more preferably 0.3 seconds to 50 seconds, and still more preferably 0.5 seconds to 6 seconds.

As described above, in the method for producing the Ni-plated steel sheet according to this embodiment, the second plating process using the second Ni-plating bath 203 is continuously performed after the first plating process using the first Ni-plating bath 201. The plating processes are performed in this order, and thus the chloride ions, which are contained in the second Ni-plating bath 203, are not mixed into the first Ni-plating bath 201.

In addition, as shown in FIG. 5A, a rinsing process of raising the surface of the steel sheet may not be provided between the first plating process and the second plating process. However, as shown in FIG. 5B, a rinsing bath 209 may be provided between the first Ni-plating bath 201 and the second Ni-plating bath 203.

FIG. 5A and FIG. 5B illustrate a case where the first Ni-plating bath 201 and the second Ni-plating bath 203 have two-pass configurations. However, the number of passes in the plating bath is not limited to that in the illustrated example, and may be increased.

FIG. 5A and FIG. 5B illustrate a case where the first Ni-plating bath 201 and the second Ni-plating bath 203 are provided as one tank respectively. However, both the first Ni-plating bath 201 and the second Ni-plating bath 203 may be configured as a plurality of sets.

EXAMPLES

Hereinafter, the Ni-plated steel sheet and the method for producing the Ni-plated steel sheet according to the invention with be described in detail with reference to Examples and Comparative Example. In addition, the following Examples are examples of the Ni-plated steel sheet and the method for producing the Ni-plated steel sheet according to the present invention. The Ni-plated steel sheet and the method for producing the Ni-plated steel sheet according to the present invention are not limited to the following Examples.

Experiment Examples (1) Ni Plating Conditions

Ni-plated steel sheets were produced, by using two kinds of Ni Plating baths shown in Table 1, and Table 3 to Table 5. In Table 1, and Table 3 to Table 5, conditions described in a column called "first Ni-plating electrolysis conditions" represent conditions relating to the first Ni-plating bath 201, and conditions described in a column called "second Ni-plating electrolysis conditions" represent conditions relating to the second Ni-plating bath 203.

Here, in Experiment Examples shown in Table 1 and Table 2, an experiment was performed with focus mainly given to characteristics of the Ni-plated steel sheet that was produced, and in Experiment Examples shown in Table 3 and Table 4, an experiment was performed while further changing the Ni-plating bath that was used for production of the Ni-plated steel sheet. In Experiment Examples shown in Table 5 Table 6, an experiment was performed while changing the coating amount of Ni by changing an electrification time in the electrolysis treatment.

Ni-plated steel sheets, which were produced under conditions shown in Table 1 to Table 6, were evaluated by the following evaluation method. Here, an amount of metal Ni which is shown in Table 2 and Table 6 was measured with a measurement device of coating amount by fluorescence X-ray, and the average central-line roughness Ra at the interface between the first Ni-plated layer 103 and the second Ni-plated layer 105, and the average central-line roughness Ra at the surface of the second Ni-plated layer 105 were measured with a probe-type surface roughness measuring device, respectively.

In addition, with regard to the chemical conversion treatment film layer 107 formed on the second Ni-plated layer 105, as shown in Table 2, a film of a chromium oxide or a film of a zirconium confound including $ZrO_2$ as a main component was formed as the chemical conversion treatment film layer 107, and evaluation was performed.

In a remark column in Table 1 to Table 6, a level corresponding to Examples of the present invention are described as Example, and a level out of the range of the present invention are described as Comparative Examples.

In Table 3 and Table 4, measurement results of an amount of metal Ni and two kinds of average central-line roughness Ra are not shown. However, even in respective levels shown in Table 3 and Table 4, results relating to levels corresponding to Examples were included in the range of the amount of metal Ni and the range of the average central-line roughness which correspond to the Ni-plated steel sheet of the present invention.

(2) Evaluation Method

In Examples, evaluation was performed with respect to Ni-plated steel sheets produced under conditions shown in Table 1, and Table 3 to Table 5 with focus given to the corrosion resistance and the wettability.

(Corrosion Resistance)

As a corrosion resistance test solution, 3% acetic acid was used. Each of the Ni-plated steel sheets shown in Table 1, and Table 3 to Table 5 was cut out in ϕ35 mm sizes, and was placed on an inlet of a heat-resistant bottle in which a corrosion resistance test solution was put, and was fixed thereto. Then, a heat treatment was performed at 121° C. for 60 minutes. After the heat treatment, corrosion resistance was evaluated using a ratio of a corroded area to an area in which the corrosion resistance test solution came into contact with the Ni-plated steel sheet. More specifically, grades from 1 point to 10 points were given in accordance with the ratio of the corroded area to the area in which a test specimen and a test solution came into contact with each other. In the corrosion resistance test, a steel sheet that received a grade of 5 points or greater can be used as a steel sheet for a container.

10 points: 100% to 90%
9 points: less than 90% and equal to or greater than 80%
8 points: less than 80% and equal to or greater than 70%
7 points: less than 70% and equal to or greater than 60%
6 points: less than 60% and equal to or greater than 50%
5 points: less than 50% and equal to or greater than 40%
4 points: less than 40% and equal to or greater than 30%
3 points: less than 30% and equal to or greater than 20%
2 points: less than 20% and equal to or greater than 10%
1 point: less than 10% and equal to or greater than 0%.

In a corrosion resistance evaluation item in Table 2 to Table 4, and Table 6, 10 points to 9 points is marked as "Very Good", 8 points to 7 points is marked as "Good", 6 points to 5 points is marked as "Fair", and 4 points or less is marked as "Poor".

(Weldability)

With regard to the weldability, a welding machine for a beverage can, which is manufactured by Soudronic AG was used, and "Good" or "Poor" as a grade of the welding was determined in accordance with existence or non-existence of expulsion which occurred at a welding site (lump of the steel sheet which extended from the welding site by approximately 1 mm). A case where the expulsion did not occur was determined as "Good", and a case where the expulsion occurs was determined as "Bad".

TABLE 1

| LEVELS | FIRST Ni-PLATING ELECTROLYSIS CONDITIONS ||||||| SECOND Ni-PLATING ELECTROLYSIS CONDITIONS ||||||| REMARKS |
| | $Ni^{2+}$ [g/L] | $SO_4^{2-}$ [g/L] | $BO_4^{3-}$ [g/L] | $Cl^-$ [g/L] | BATH TEMPERATURE [° C.] | CURRENT DENSITY [A/dm$^2$] | ELECTRIFICATION TIME [S] | $Ni^{2+}$ [g/L] | $SO_4^{2-}$ [g/L] | $BO_4^{3-}$ [g/L] | $Cl^-$ [g/L] | BATH TEMPERATURE [° C.] | CURRENT DENSITY [A/dm$^2$] | ELECTRIFICATION TIME [S] | |
|---|---|---|---|---|---|---|---|---|---|---|---|---|---|---|---|
| A1 | <u>61.2</u> | 183.8 | 13.5 | 0 | 62.5 | 17.8 | <u>155.0</u> | 41.1 | 266.4 | 22.8 | 25.6 | 19.9 | 32.2 | 116.6 | REFERRED TO AS COMPARATIVE EXAMPLE FROM THE VIEWPOINT OF COST EFFECTIVE |
| A2 | 51.1 | 226.0 | 25.9 | 0 | 31.2 | 1.1 | 45.3 | 15.8 | 180.7 | 49.5 | 14.9 | 30.2 | 65.2 | 135.7 | EXAMPLE |
| A3 | 25.5 | 42.4 | 54.7 | 0 | 23.7 | 1.2 | 11.9 | 9.5 | 112.4 | 57.3 | 24.4 | 29.7 | 2.9 | 37.5 | EXAMPLE |
| A4 | 32.0 | 108.2 | 53.6 | 0 | 37.8 | <u>0.5</u> | 125.5 | 43.5 | 120.5 | 35.6 | 17.5 | 52.0 | <u>0.1</u> | 69.9 | COMPARATIVE EXAMPLE |
| A5 | 44.1 | 222.6 | 39.7 | 0 | 50.2 | <u>103</u> | 122.5 | 14.2 | 156.0 | 24.2 | 45.4 | 89.4 | 19.2 | 21.8 | COMPARATIVE EXAMPLE |
| A6 | 13.0 | 297.6 | 52.3 | 0 | <u>94.4</u> | 21.2 | 104.5 | <u>65.0</u> | <u>310.0</u> | 54.3 | 48.4 | 63.7 | <u>103.4</u> | 120.3 | COMPARATIVE EXAMPLE |
| A7 | 21.4 | 51.4 | 34.2 | 0 | 82.6 | 1.1 | 83.5 | 12.2 | 295.5 | 22.1 | 31.6 | 43.2 | 90.5 | 106.1 | EXAMPLE |
| A8 | 26.2 | 230.0 | 32.7 | 0 | 42.3 | 1.2 | 46.6 | 8.0 | 160.9 | 48.9 | 33.9 | 60.6 | 86.7 | 27.7 | EXAMPLE |
| A9 | 42.2 | 259.9 | 35.3 | 0 | 13.7 | 1.1 | 147.7 | <u>4.5</u> | <u>18.9</u> | 55.2 | 16.2 | 74.1 | <u>0.4</u> | 52.2 | COMPARATIVE EXAMPLE |
| A10 | 21.1 | 224.3 | 18.2 | 0 | 16.7 | 1.4 | 92.6 | 56.3 | 174.6 | 24.2 | 42.4 | 51.9 | 88.6 | 68.4 | EXAMPLE |
| A11 | 57.9 | 48.8 | 36.3 | 0 | 26.3 | 57.8 | 135.1 | 40.6 | 227.9 | 59.1 | 18.0 | 52.1 | 26.0 | 21.9 | EXAMPLE |
| A12 | 45.8 | 239.6 | 10.3 | 0 | 67.1 | 21.5 | 0.30 | 33.1 | 27.2 | 30.5 | 32.8 | 87.2 | 76.6 | 4.6 | EXAMPLE |
| A13 | 7.8 | 139.9 | 50.1 | 0 | 28.2 | 70.7 | 0.32 | 22.9 | 194.6 | 32.2 | 41.8 | 71.0 | 45.2 | 23.3 | EXAMPLE |
| A14 | 40.7 | 254.2 | 37.2 | 0 | 81.6 | 22.2 | 61.7 | 35.3 | 167.4 | 39.0 | 21.8 | 84.8 | 18.7 | 2.0 | EXAMPLE |
| A15 | 11.0 | 246.5 | 58.0 | 0 | 10.39 | 57.6 | 2.0 | 36.2 | 137.7 | 32.3 | 34.8 | 21.6 | 59.7 | 60.4 | EXAMPLE |
| A16 | 43.0 | 191.1 | 25.2 | 0 | 10.38 | 55.2 | 5.0 | 34.5 | 181.2 | 24.5 | 41.1 | 89.3 | 76.1 | 23.0 | EXAMPLE |
| A17 | 27.3 | 219.8 | 54.0 | 0 | 86.5 | 100 | 125.0 | 19.5 | 156.5 | 46.7 | 24.7 | 25.3 | 46.5 | 26.0 | EXAMPLE |
| A18 | 41.8 | 182.7 | 13.5 | 0 | 26.7 | 91 | 126.6 | 55.6 | 247.9 | 50.6 | 54.3 | 83.3 | 12.8 | 109.9 | EXAMPLE |
| A19 | 7.7 | 108.7 | 48.2 | 0 | 51.1 | 22.0 | 122.2 | 49.5 | 184.8 | 12.0 | 28.3 | 51.0 | 28.5 | 31.0 | EXAMPLE |
| A20 | 15.7 | 287.3 | 21.4 | 0 | 20.6 | 22.8 | 19.1 | 11.8 | 246.9 | 51.5 | 35.9 | 64.2 | 4.6 | 23.3 | EXAMPLE |
| A21 | 48.6 | 282.3 | 22.9 | 0 | 22.6 | 80.0 | 120.0 | 56.0 | 126.3 | 31.7 | 51.5 | 18.9 | 52.9 | 123.0 | EXAMPLE |
| A22 | 42.4 | 103.7 | 36.8 | 0 | 47.9 | 16.6 | 12.0 | 38.5 | 261.4 | 46.9 | 18.0 | 47.9 | 11.4 | 126.0 | EXAMPLE |
| A23 | 34.9 | 37.7 | 31.1 | 0 | 31.6 | 33.8 | 6.0 | 47.0 | 168.9 | 17.2 | 23.7 | 60.8 | 39.2 | 1.0 | EXAMPLE |
| A24 | 22.5 | 261.6 | 27.1 | 0 | 26.0 | 43.9 | 31.7 | 38.0 | 164.3 | 54.6 | 21.2 | 44.4 | 79.2 | 124.0 | EXAMPLE |
| A25 | 58.1 | 280.7 | 16.7 | 0 | 37.7 | 18.5 | 12.0 | 52.8 | 129.3 | 21.1 | 47.7 | 60.6 | 91.6 | 1.0 | EXAMPLE |
| A26 | 38.1 | 104.1 | 24.0 | 0 | 72.4 | 58.2 | 12.0 | 42.7 | 263.0 | 45.3 | 41.2 | 49.7 | 22.3 | 120.0 | EXAMPLE |
| A27 | 7.0 | 94.8 | 31.6 | 0 | 62.6 | 61.7 | 2.0 | 29.2 | 95.0 | 32.0 | 29.8 | 75.0 | 53.2 | 145.0 | EXAMPLE |
| A28 | 12.5 | 218.4 | 25.4 | <u>0.7</u> | 52.1 | 36.9 | 25.3 | 39.1 | 213.6 | 41.3 | 31.9 | 29.5 | 23.8 | 43.2 | COMPARATIVE EXAMPLE |

TABLE 2

| LEVELS | AMOUNT OF METAL Ni [mg/m²] | AMOUNT OF METAL Ni IN FIRST Ni-PLATED LAYER [mg/m²] | AMOUNT OF METAL Ni IN SECOND Ni-PLATED LAYER [mg/m²] | AVERAGE CENTRAL-LINE ROUGHNESS Ra AT INTERFACE BETWEEN FIRST Ni-PLATED LAYER AND SECOND Ni-PLATED LAYER [μm] | AVERAGE CENTRAL-LINE ROUGHNESS Ra AT SURFACE OF SECOND Ni-PLATED LAYER [μm] | FILM OF CHROMIUM OXIDE [mg/m²] |
|---|---|---|---|---|---|---|
| A1 | 2520.7 | 2011.0 | 509.7 | 0.07 | 50.1 | 0.0 |
| A2 | 2480.0 | 1990.0 | 490.0 | 0.04 | 10.0 | 0.0 |
| A3 | 23.0 | 15.0 | 8.0 | 0.09 | 67.5 | 0.0 |
| A4 | 18.2 | 14.0 | 4.2 | 0.04 | 58.5 | 0.0 |
| A5 | 1248.9 | 1130.0 | 118.9 | 0.12 | 83.6 | 0.0 |
| A6 | 1603.8 | 1430.0 | 173.8 | 0.04 | 103.5 | 0.0 |
| A7 | 512.8 | 321.1 | 191.7 | 0.03 | 94.5 | 0.0 |
| A8 | 566.5 | 342.0 | 224.5 | 0.01 | 0.12 | 0.0 |
| A9 | 1263.1 | 1124.0 | 139.1 | 0.09 | 0.08 | 0.0 |
| A10 | 124.0 | 224.2 | 424.0 | 0.08 | 14.0 | 5.0 |
| A11 | 453.0 | 329.0 | 302.1 | 0.09 | 51.3 | 20.0 |
| A12 | 1693.4 | 1230.0 | 463.4 | 0.08 | 26.3 | 0.0 |
| A13 | 773.0 | 2.0 | 122.0 | 0.08 | 78.8 | 0.0 |
| A14 | 648.2 | 450.0 | 3.0 | 0.03 | 86.7 | 0.0 |
| A15 | 631.1 | 430.2 | 342.8 | 0.03 | 99.0 | 0.0 |
| A16 | 211.9 | 110.0 | 101.9 | 0.01 | 57.6 | 0.0 |
| A17 | 1881.2 | 1850.0 | 31.2 | 0.03 | 59.5 | 0.0 |
| A18 | 2005.3 | 1924.2 | 81.1 | 0.04 | 47.0 | 0.0 |
| A19 | 236.6 | 128.2 | 108.4 | 0.03 | 41.9 | 0.0 |
| A20 | 1066.2 | 632.3 | 433.9 | 0.01 | 75.0 | 0.0 |
| A21 | 2464.8 | 2124.2 | 340.6 | 0.06 | 41.9 | 0.0 |
| A22 | 2003.6 | 1732.5 | 271.1 | 0.08 | 31.6 | 0.0 |
| A23 | 102.91 | 38.20 | 64.7 | 0.06 | 55.8 | 0.0 |
| A24 | 2148.44 | 1835.30 | 313.1 | 0.06 | 75.0 | 0.0 |
| A25 | 268.64 | 123.54 | 145.1 | 0.06 | 74.2 | 0.0 |
| A26 | 2032.16 | 1639.50 | 392.7 | 0.07 | 99.3 | 0.0 |
| A27 | 1927.63 | 1574.30 | 353.3 | 0.07 | 27.7 | 0.0 |
| A28 | 437.5 | 128.3 | 309.2 | 12.2 | 29.4 | 0.0 |

| LEVELS | FILM OF ZIRCONIUM COMPOUND [mg/m²] | EVALUATION CORROSION RESISTANCE | WELDABILITY | REMARKS |
|---|---|---|---|---|
| A1 | 0.0 | VERY GOOD | GOOD | REFERRED TO AS COMPARATIVE EXAMPLE FROM THE VIEWPOINT OF COST EFFECTIVE |
| A2 | 0.0 | VERY GOOD | GOOD | EXAMPLE |
| A3 | 0.0 | VERY GOOD | GOOD | EXAMPLE |
| A4 | 0.0 | POOR | BAD | COMPARATIVE EXAMPLE |
| A5 | 0.0 | GOOD | BAD | COMPARATIVE EXAMPLE |
| A6 | 0.0 | GOOD | BAD | COMPARATIVE EXAMPLE |
| A7 | 0.0 | VERY GOOD | GOOD | EXAMPLE |
| A8 | 0.0 | VERY GOOD | GOOD | EXAMPLE |
| A9 | 0.0 | POOR | GOOD | COMPARATIVE EXAMPLE |
| A10 | 0.0 | VERY GOOD | GOOD | EXAMPLE |
| A11 | 0.0 | VERY GOOD | GOOD | EXAMPLE |
| A12 | 25.0 | VERY GOOD | GOOD | EXAMPLE |
| A13 | 2.0 | FAIR | GOOD | EXAMPLE |
| A14 | 0.0 | VERY GOOD | GOOD | EXAMPLE |
| A15 | 0.0 | VERY GOOD | GOOD | EXAMPLE |
| A16 | 0.0 | VERY GOOD | GOOD | EXAMPLE |
| A17 | 0.0 | VERY GOOD | GOOD | EXAMPLE |
| A18 | 0.0 | VERY GOOD | GOOD | EXAMPLE |
| A19 | 0.0 | VERY GOOD | GOOD | EXAMPLE |
| A20 | 0.0 | VERY GOOD | GOOD | EXAMPLE |
| A21 | 0.0 | VERY GOOD | GOOD | EXAMPLE |
| A22 | 0.0 | VERY GOOD | GOOD | EXAMPLE |
| A23 | 0.0 | VERY GOOD | GOOD | EXAMPLE |
| A24 | 0.0 | VERY GOOD | GOOD | EXAMPLE |
| A25 | 0.0 | VERY GOOD | GOOD | EXAMPLE |
| A26 | 0.0 | VERY GOOD | GOOD | EXAMPLE |
| A27 | 0.0 | VERY GOOD | GOOD | EXAMPLE |
| A28 | 0.0 | POOR | GOOD | COMPARATIVE EXAMPLE |

TABLE 3

| | FIRST Ni-PLATING ELECTROLYSIS CONDITIONS | | | | | | | SECOND Ni-PLATING ELECTROLYSIS CONDITIONS | |
|---|---|---|---|---|---|---|---|---|---|
| LEVELS | $Ni^{2+}$ [g/L] | $SO_4^{2-}$ [g/L] | $BO_4^{3-}$ [g/L] | $Cl^-$ [g/L] | BATH TEMPERATURE [°C.] | CURRENT DENSITY [A/dm²] | ELECTRIFICATION TIME [S] | $Ni^{2-}$ [g/L] | $SO_4^{2-}$ [g/L] |
| B1 | 62.2 | 56.0 | 39.7 | 0.0 | 28.2 | 80.7 | 38.7 | 34.2 | 134.5 |
| B2 | 57.2 | 287.8 | 20.9 | 0.0 | 84.6 | 58.6 | 97.2 | 16.9 | 116.3 |
| B3 | 5.5 | 122.1 | 18.9 | 0.0 | 76.1 | 23.0 | 149.7 | 49.9 | 249.2 |
| B4 | 4.9 | 45.2 | 43.0 | 0.0 | 40.1 | 33.6 | 59.6 | 40.6 | 291.6 |
| B5 | 22.3 | 307.6 | 21.6 | 0.0 | 46.3 | 40.0 | 36.4 | 11.3 | 107.6 |
| B6 | 59.0 | 298.4 | 22.0 | 0.0 | 21.8 | 53.6 | 59.6 | 58.5 | 48.5 |
| B7 | 21.2 | 21.4 | 29.1 | 0.0 | 56.3 | 31.4 | 39.9 | 49.4 | 196.8 |
| B8 | 31.7 | 19.0 | 35.8 | 0.0 | 59.3 | 46.7 | 88.7 | 45.2 | 235.4 |
| B9 | 27.7 | 32.6 | 65.6 | 0.0 | 43.5 | 33.8 | 89.6 | 29.9 | 212.1 |
| B10 | 15.4 | 213.1 | 54.3 | 0.0 | 52.9 | 3.6 | 59.4 | 29.1 | 164.8 |
| B11 | 40.8 | 190.0 | 10.1 | 0.0 | 54.7 | 38.6 | 56.6 | 16.8 | 128.0 |
| B12 | 31.3 | 183.8 | 9.6 | 0.0 | 46.0 | 76.9 | 110.3 | 12.5 | 79.7 |
| B13 | 48.1 | 89.1 | 42.9 | 0.0 | 99.0 | 48.2 | 79.7 | 33.3 | 110.1 |
| B14 | 36.6 | 76.7 | 44.3 | 0.0 | 85.3 | 17.6 | 119.2 | 13.4 | 256.0 |
| B15 | 22.0 | 73.9 | 34.2 | 0.0 | 10.59 | 60.8 | 139.0 | 38.3 | 180.9 |
| B16 | 33.7 | 291.0 | 30.8 | 0.0 | 9.88 | 4.9 | 56.5 | 42.0 | 108.5 |
| B17 | 50.2 | 291.7 | 10.0 | 0.0 | 31.2 | 107.7 | 18.1 | 46.4 | 89.5 |
| B18 | 42.0 | 286.8 | 46.5 | 0.0 | 43.4 | 92.9 | 91.0 | 39.2 | 187.3 |
| B19 | 55.7 | 186.7 | 22.2 | 0.0 | 34.8 | 1.0 | 88.8 | 15.6 | 188.7 |
| B20 | 42.5 | 271.8 | 46.1 | 0.0 | 75.3 | 0.8 | 85.4 | 8.0 | 31.5 |
| B21 | 16.7 | 203.9 | 31.1 | 0.0 | 83.7 | 60.9 | 152.1 | 20.6 | 104.5 |
| B22 | 41.2 | 45.2 | 13.4 | 0.0 | 76.1 | 59.9 | 145.0 | 30.1 | 65.9 |
| B23 | 18.3 | 203.2 | 39.6 | 0.0 | 16.0 | 50.6 | 0.21 | 37.4 | 50.8 |
| B24 | 37.6 | 238.5 | 58.2 | 0.0 | 85.9 | 29.5 | 0.19 | 10.2 | 181.2 |
| B25 | 44.4 | 136.2 | 41.7 | 0.0 | 71.8 | 1.1 | 81.3 | 63.2 | 294.2 |
| B26 | 19.0 | 232.5 | 47.4 | 0.0 | 10.7 | 80.2 | 105.5 | 58.5 | 271.5 |
| B27 | 22.2 | 280.8 | 30.2 | 0.0 | 88.9 | 84.9 | 81.7 | 5.13 | 165.6 |
| B28 | 18.8 | 148.3 | 37.2 | 0.0 | 54.1 | 82.3 | 25.3 | 4.68 | 205.0 |
| B29 | 46.6 | 246.3 | 54.8 | 0.0 | 68.7 | 96.6 | 30.7 | 9.5 | 310.6 |
| B30 | 38.8 | 163.1 | 32.3 | 0.0 | 67.0 | 32.0 | 62.8 | 55.3 | 272.0 |

| | SECOND Ni-PLATING ELECTROLYSIS CONDITIONS | | | | | EVALUATION | | |
|---|---|---|---|---|---|---|---|---|
| LEVELS | $BO_4^{3-}$ [g/L] | $Cl^-$ [g/L] | BATH TEMPERATURE [°C.] | CURRENT DENSITY [A/dm²] | ELECTRIFICATION TIME [S] | CORROSION RESISTANCE | WELDABILITY | REMARKS |
| B1 | 57.2 | 53.4 | 78.9 | 59.8 | 33.7 | POOR | GOOD | COMPARATIVE EXAMPLE |
| B2 | 28.5 | 15.7 | 83.1 | 23.9 | 99.1 | VERY GOOD | GOOD | EXAMPLE |
| B3 | 16.8 | 51.2 | 89.3 | 54.2 | 66.2 | VERY GOOD | GOOD | EXAMPLE |
| B4 | 45.4 | 41.1 | 88.4 | 85.5 | 131.7 | POOR | BAD | COMPARATIVE EXAMPLE |
| B5 | 55.4 | 36.7 | 66.4 | 93.8 | 145.3 | POOR | GOOD | COMPARATIVE EXAMPLE |
| B6 | 26.5 | 58.2 | 58.3 | 15.5 | 141.7 | VERY GOOD | GOOD | EXAMPLE |
| B7 | 19.4 | 27.3 | 60.3 | 9.7 | 104.4 | VERY GOOD | GOOD | EXAMPLE |
| B8 | 21.3 | 10.2 | 20.5 | 47.4 | 30.0 | POOR | BAD | COMPARATIVE EXAMPLE |
| B9 | 52.1 | 15.0 | 31.6 | 14.9 | 46.8 | POOR | GOOD | COMPARATIVE EXAMPLE |
| B10 | 44.7 | 11.7 | 79.5 | 24.6 | 40.2 | VERY GOOD | GOOD | EXAMPLE |
| B11 | 57.7 | 26.8 | 46.2 | 8.1 | 6.8 | VERY GOOD | GOOD | EXAMPLE |
| B12 | 40.3 | 49.3 | 88.3 | 38.1 | 94.1 | POOR | GOOD | COMPARATIVE EXAMPLE |
| B13 | 32.3 | 37.9 | 10.7 | 12.8 | 70.0 | POOR | GOOD | COMPARATIVE EXAMPLE |
| B14 | 29.4 | 45.9 | 86.4 | 84.9 | 5.0 | VERY GOOD | GOOD | EXAMPLE |
| B15 | 32.3 | 56.3 | 43.6 | 48.4 | 14.4 | VERY GOOD | GOOD | EXAMPLE |
| B16 | 14.3 | 26.0 | 13.5 | 94.0 | 16.9 | POOR | BAD | COMPARATIVE EXAMPLE |
| B17 | 19.3 | 51.7 | 42.6 | 62.6 | 116.2 | POOR | GOOD | COMPARATIVE EXAMPLE |
| B18 | 32.0 | 21.9 | 72.8 | 22.2 | 63.5 | VERY GOOD | GOOD | EXAMPLE |
| B19 | 44.9 | 44.7 | 36.5 | 79.1 | 115.0 | VERY GOOD | GOOD | EXAMPLE |
| B20 | 25.2 | 11.3 | 24.8 | 60.2 | 78.6 | POOR | BAD | COMPARATIVE EXAMPLE |
| B21 | 36.4 | 13.6 | 63.0 | 38.5 | 145.9 | POOR | GOOD | COMPARATIVE EXAMPLE |
| B22 | 18.7 | 59.8 | 46.1 | 80.9 | 142.1 | VERY GOOD | GOOD | EXAMPLE |
| B23 | 52.6 | 10.7 | 43.7 | 32.3 | 0.4 | VERY GOOD | GOOD | EXAMPLE |
| B24 | 27.5 | 51.4 | 14.1 | 13.3 | 100.9 | POOR | BAD | COMPARATIVE EXAMPLE |
| B25 | 27.8 | 54.8 | 27.0 | 77.1 | 142.4 | POOR | GOOD | COMPARATIVE EXAMPLE |
| B26 | 45.3 | 23.8 | 54.6 | 11.0 | 14.7 | VERY GOOD | GOOD | EXAMPLE |
| B27 | 32.7 | 35.0 | 88.0 | 19.0 | 26.4 | VERY GOOD | GOOD | EXAMPLE |
| B28 | 27.8 | 20.8 | 73.3 | 18.6 | 5.3 | POOR | BAD | COMPARATIVE EXAMPLE |
| B29 | 36.1 | 34.2 | 76.2 | 19.4 | 24.8 | POOR | GOOD | COMPARATIVE EXAMPLE |
| B30 | 46.0 | 54.2 | 50.8 | 28.1 | 148.1 | VERY GOOD | GOOD | EXAMPLE |

TABLE 4

| | FIRST Ni-PLATING ELECTROLYSIS CONDITIONS | | | | | | | SECOND Ni-PLATING ELECTROLYSIS CONDITIONS | |
|---|---|---|---|---|---|---|---|---|---|
| LEVELS | $Ni^{2+}$ [g/L] | $SO_4^{2-}$ [g/L] | $BO_4^{3-}$ [g/L] | $Cl^-$ [g/L] | BATH TEMPERATURE [°C] | CURRENT DENSITY [A/dm²] | ELECTRIFICATION TIME [S] | $Ni^{2+}$ [g/L] | $SO_4^{2-}$ [g/L] |
| B31 | 47.9 | 260.6 | 12.6 | 0 | 34.5 | 14.0 | 129.4 | 19.6 | 21.94 |
| B32 | 23.5 | 208.8 | 28.4 | 0 | 34.1 | 88.5 | 19.5 | 52.6 | <u>18.02</u> |
| B33 | 25.0 | 266.0 | 30.8 | 0 | 42.7 | 99.6 | 9.7 | 49.2 | 124.0 |
| B34 | 29.2 | 115.1 | 11.6 | 0 | 74.0 | 90.2 | 95.9 | 41.0 | 234.2 |
| B35 | 56.9 | 283.4 | 30.7 | 0 | 64.2 | 40.2 | 70.3 | 8.1 | 57.0 |
| B36 | 35.8 | 299.0 | 38.0 | 0 | 27.0 | 23.3 | 15.2 | 6.2 | 278.2 |
| B37 | 40.6 | 296.5 | 23.9 | 0 | 40.7 | 21.6 | 84.0 | 21.7 | 85.1 |
| B38 | 55.0 | 149.3 | 56.5 | 0 | 71.0 | 68.0 | 104.3 | 34.4 | 67.2 |
| B39 | 39.1 | 115.7 | 33.9 | 0 | 84.3 | 43.0 | 55.2 | 8.5 | 114.2 |
| B40 | 27.4 | 137.3 | 16.6 | 0 | 25.5 | 28.6 | 112.7 | 49.7 | 116.0 |
| B41 | 42.0 | 46.2 | 27.1 | 0 | 35.4 | 2.9 | 120.6 | 7.3 | 213.2 |
| B42 | 10.3 | 124.2 | 21.4 | 0 | 40.5 | 65.0 | 47.1 | 30.5 | 87.7 |
| B43 | 39.6 | 225.2 | 48.4 | 0 | 69.2 | 15.3 | 131.7 | 27.8 | 100.1 |
| B44 | 47.9 | 128.3 | 52.9 | 0 | 15.8 | 91.2 | 89.9 | 23.8 | 236.5 |
| B45 | 52.1 | 253.5 | 11.4 | 0 | 27.5 | 12.6 | 62.4 | 56.5 | 30.9 |
| B46 | 7.9 | 48.1 | 49.8 | 0 | 67.2 | 91.7 | 69.0 | 60.0 | 104.1 |
| B47 | 18.3 | 157.2 | 33.7 | 0 | 27.4 | 27.0 | 30.2 | 36.3 | 290.0 |
| B48 | 28.6 | 212.4 | 47.2 | 0 | 11.7 | 47.6 | 11.7 | 20.7 | 100.1 |
| B49 | 6.1 | 151.6 | 19.0 | 0 | 83.6 | 53.6 | 62.8 | 25.1 | 137.7 |
| B50 | 57.6 | 88.6 | 50.3 | 0 | 49.9 | 37.9 | 128.0 | 57.7 | 178.5 |
| B51 | 43.3 | 185.3 | 24.5 | 0 | 55.6 | 65.1 | 146.6 | 33.9 | 79.1 |
| B52 | 31.8 | 170.6 | 49.1 | 0 | 14.1 | 65.0 | 35.2 | 31.4 | 93.4 |
| B53 | 59.9 | 245.3 | 52.6 | 0 | 14.2 | 3.4 | 148.6 | 53.9 | 191.8 |
| B54 | 39.3 | 146.7 | 12.6 | 0 | 56.0 | 51.9 | 93.2 | 6.6 | 252.2 |

| | SECOND Ni-PLATING ELECTROLYSIS CONDITIONS | | | | | EVALUATION | | |
|---|---|---|---|---|---|---|---|---|
| LEVELS | $BO_4^{3-}$ [g/L] | $Cl^-$ [g/L] | BATH TEMPERATURE [°C] | CURRENT DENSITY [A/dm²] | ELECTRIFICATION TIME [S] | CORROSION RESISTANCE | WELDABILITY | REMARKS |
| B31 | 27.8 | 44.9 | 87.7 | 85.4 | 118.9 | VERY GOOD | GOOD | EXAMPLE |
| B32 | 23.6 | 29.5 | 18.8 | 67.9 | 33.1 | POOR | BAD | COMPARATIVE EXAMPLE |
| B33 | <u>65.5</u> | 46.5 | 61.3 | 15.4 | 63.1 | POOR | GOOD | COMPARATIVE EXAMPLE |
| B34 | 55.0 | 41.7 | 42.2 | 84.3 | 68.5 | VERY GOOD | GOOD | EXAMPLE |
| B35 | 10.62 | 24.5 | 24.5 | 15.0 | 106.7 | VERY GOOD | GOOD | EXAMPLE |
| B36 | <u>9.18</u> | 56.9 | 62.5 | 39.7 | 104.4 | POOR | BAD | COMPARATIVE EXAMPLE |
| B37 | 33.6 | <u>61.7</u> | 54.3 | 17.1 | 41.5 | POOR | GOOD | COMPARATIVE EXAMPLE |
| B38 | 41.8 | 58.8 | 55.4 | 40.3 | 48.8 | VERY GOOD | GOOD | EXAMPLE |
| B39 | 19.2 | 10.11 | 60.7 | 17.5 | 78.4 | VERY GOOD | GOOD | EXAMPLE |
| B40 | 23.3 | <u>9.92</u> | 57.8 | 57.9 | 3.4 | POOR | BAD | COMPARATIVE EXAMPLE |
| B41 | 30.7 | 43.0 | <u>98.7</u> | 96.8 | 32.8 | POOR | GOOD | COMPARATIVE EXAMPLE |
| B42 | 11.8 | 24.7 | 86.3 | 29.5 | 61.5 | VERY GOOD | GOOD | EXAMPLE |
| B43 | 20.1 | 25.5 | 10.22 | 30.6 | 93.5 | VERY GOOD | GOOD | EXAMPLE |
| B44 | 17.1 | 26.6 | <u>9.74</u> | 43.6 | 142.2 | POOR | BAD | COMPARATIVE EXAMPLE |
| B45 | 25.3 | 59.6 | 22.6 | <u>105.3</u> | 136.7 | POOR | GOOD | COMPARATIVE EXAMPLE |
| B46 | 53.3 | 16.7 | 12.1 | 91.5 | 32.0 | VERY GOOD | GOOD | EXAMPLE |
| B47 | 15.6 | 28.9 | 84.0 | 1.09 | 121.9 | VERY GOOD | GOOD | EXAMPLE |
| B48 | 13.4 | 17.9 | 40.2 | <u>0.91</u> | 105.4 | POOR | BAD | COMPARATIVE EXAMPLE |
| B49 | 53.5 | 52.6 | 65.7 | 93.5 | <u>159.7</u> | POOR | GOOD | COMPARATIVE EXAMPLE |
| B50 | 37.3 | 35.2 | 32.7 | 88.4 | 139.4 | VERY GOOD | GOOD | EXAMPLE |
| B51 | 42.2 | 16.3 | 74.1 | 34.5 | 0.21 | VERY GOOD | GOOD | EXAMPLE |
| B52 | 15.8 | 41.5 | 11.1 | 37.7 | <u>0.18</u> | POOR | BAD | COMPARATIVE EXAMPLE |
| B53 | 44.2 | 39.0 | 66.6 | 91.4 | 140.7 | FAIR | GOOD | EXAMPLE |
| B54 | 34.4 | 23.5 | 88.7 | 67.2 | 84.7 | FAIR | GOOD | EXAMPLE |

TABLE 5

| LEVELS | FIRST Ni-PLATING ELECTROLYSIS CONDITIONS | | | | | | | SECOND Ni-PLATING ELECTROLYSIS CONDITIONS | | | | | | |
|---|---|---|---|---|---|---|---|---|---|---|---|---|---|---|
| | $Ni^{2+}$ [g/L] | $SO_4^{2-}$ [g/L] | $BO_4^{3-}$ [g/L] | $Cl^-$ [g/L] | BATH TEMPERATURE [° C.] | CURRENT DENSITY [A/dm²] | ELECTRIFICATION TIME [S] | $Ni^{2+}$ [g/L] | $SO_4^{2-}$ [g/L] | $BO_4^{3-}$ [g/L] | $Cl^-$ [g/L] | BATH TEMPERATURE [° C.] | CURRENT DENSITY [A/dm²] | ELECTRIFICATION TIME [S] |
| C1-1 | 21.4 | 51.4 | 34.2 | 0 | 82.6 | 1.1 | 0.55 | 12.2 | 295.5 | 22.1 | 31.6 | 43.2 | 90.5 | 0.5 |
| C1-2 | 21.4 | 51.4 | 34.2 | 0 | 82.6 | 1.1 | 9.9 | 12.2 | 295.5 | 22.1 | 31.6 | 43.2 | 90.5 | 0.2 |
| C1-3 | 21.4 | 51.4 | 34.2 | 0 | 82.6 | 1.1 | 18.5 | 12.2 | 295.5 | 22.1 | 31.6 | 43.2 | 90.5 | 0.8 |
| C1-4 | 21.4 | 51.4 | 34.2 | 0 | 82.6 | 1.1 | 26.5 | 12.2 | 295.5 | 22.1 | 31.6 | 43.2 | 90.5 | 1.5 |
| C1-5 | 21.4 | 51.4 | 34.2 | 0 | 82.6 | 1.1 | 52.3 | 12.2 | 295.5 | 22.1 | 31.6 | 43.2 | 90.5 | 1.3 |
| C2-1 | 26.2 | 230.0 | 32.7 | 0 | 42.3 | 1.2 | 6.5 | 8.0 | 160.9 | 48.9 | 33.9 | 60.6 | 86.7 | 0.2 |
| C2-2 | 26.2 | 230.0 | 32.7 | 0 | 42.3 | 1.2 | 8.2 | 8.0 | 160.9 | 48.9 | 33.9 | 60.6 | 86.7 | 0.5 |
| C2-3 | 26.2 | 230.0 | 32.7 | 0 | 42.3 | 1.2 | 17.2 | 8.0 | 160.9 | 48.9 | 33.9 | 60.6 | 86.7 | 0.9 |
| C2-4 | 26.2 | 230.0 | 32.7 | 0 | 42.3 | 1.2 | 26.3 | 8.0 | 160.9 | 48.9 | 33.9 | 60.6 | 86.7 | 1.0 |
| C2-5 | 26.2 | 230.0 | 32.7 | 0 | 42.3 | 1.2 | 53.2 | 8.0 | 160.9 | 48.9 | 33.9 | 60.6 | 86.7 | 1.2 |

TABLE 6

| LEVELS | AMOUNT OF METAL Ni [mg/m²] | AMOUNT OF METAL Ni IN FIRST Ni-PLATED LAYER [mg/m²] | AMOUNT OF METAL Ni IN SECOND Ni-PLATED LAYER [mg/m²] | AVERAGE CENTRAL-LINE ROUGHNESS Ra AT INTERFACE BETWEEN FIRST Ni-PLATED LAYER AND SECOND Ni-PLATED LAYER [μm] | AVERAGE CENTRAL-LINE ROUGHNESS Ra AT SURFACE OF SECOND Ni-PLATED LAYER [μm] |
|---|---|---|---|---|---|
| C1-1 | 134.7 | 7.4 | 127.3 | 0.05 | 45.3 |
| C1-2 | 351.4 | 292.8 | 58.6 | 0.04 | 51.3 |
| C1-3 | 512.8 | 321.1 | 191.7 | 0.06 | 74.6 |
| C1-4 | 724.7 | 364.5 | 360.3 | 0.07 | 33.1 |
| C1-5 | 1266.7 | 940.5 | 326.1 | 0.02 | 57.2 |
| C2-1 | 218.0 | 167.0 | 51.0 | 0.04 | 81.6 |
| C2-2 | 269.5 | 147.3 | 122.3 | 0.02 | 34.6 |
| C2-3 | 566.5 | 342.0 | 224.5 | 0.08 | 51.4 |
| C2-4 | 865.2 | 629.1 | 236.1 | 0.05 | 73.3 |
| C2-5 | 1386.8 | 1083.9 | 302.8 | 0.09 | 64.1 |

| LEVELS | EVALUATION | | REMARKS |
|---|---|---|---|
| | CORROSION RESISTANCE | WELDABILITY | |
| C1-1 | GOOD | GOOD | EXAMPLE |
| C1-2 | GOOD | GOOD | EXAMPLE |
| C1-3 | VERY GOOD | GOOD | EXAMPLE |
| C1-4 | VERY GOOD | GOOD | EXAMPLE |
| C1-5 | GOOD | GOOD | EXAMPLE |
| C2-1 | GOOD | GOOD | EXAMPLE |
| C2-2 | GOOD | GOOD | EXAMPLE |
| C2-3 | VERY GOOD | GOOD | EXAMPLE |
| C2-4 | VERY GOOD | GOOD | EXAMPLE |
| C2-5 | GOOD | GOOD | EXAMPLE |

As is clear from Table 1 to Table 6, through the corrosion resistance test and the welding test, it was proved that the steel sheets of the present invention have excellent corrosion resistance and weldability.

Hereinbefore, an appropriate embodiment of the present invention has been described in detail with reference to the accompanying drawings, but the invention is not limited to the example. It should be understood by those skilled in the art that various modification examples or change examples can be made in the scope of the contents described in claims, and these examples are also intended to be included in the technical scope of the invention.

INDUSTRIAL APPLICABILITY

According to the invention, two kinds of Ni-plated layers are formed on the surface of the steel sheet, and thus it is possible to provide a Ni-plated steel sheet which has more excellent corrosion resistance and weldability and is highly cost effective.

BRIEF DESCRIPTION OF THE REFERENCE SYMBOLS

10: Ni-PLATED STEEL SHEET
101: STEEL SHEET
103: FIRST Ni-PLATED LAYER
105: SECOND Ni-PLATED LAYER
107: CHEMICAL-CONVERSION TREATMENT FILM LAYER
201: FIRST Ni-PLATING BATH
203: SECOND Ni-PLATING BATH 205, 207: ELECTRODE
209: RINSING BATH

The invention claimed is:

1. A Ni-plated steel sheet, comprising:
   a steel sheet;
   a first Ni-plated layer which is formed at least on a one-sided surface of the steel sheet and contains Ni; and
   a second Ni-plated layer which is formed on the first Ni-plated layer and contains Ni, wherein an average central-line roughness Ra at an interface between the first Ni-plated layer and the second Ni-plated layer is less than 0.1 μm,
   an average central-line roughness Ra of a surface of the second Ni-plated layer is 0.1 μm to 100 μm, and
   a coating amount of Ni in an entirety of the first Ni-plated layer and the second Ni-plated layer is 20 mg/m$^2$ to 2500 mg/m$^2$ per one-sided surface in terms of metal Ni.

2. The Ni-plated steel sheet according to claim 1, wherein an amount of chlorine in the first Ni-plated layer is 0 ppm to 100 ppm.

3. The Ni-plated steel sheet according to claim 1 or 2, wherein a coating amount of Ni in the first Ni-plated layer is 15 mg/m$^2$ to 2000 mg/m$^2$ per one-sided surface in terms of metal Ni, and
   a coating amount of Ni in the second Ni-plated layer is 5 mg/m$^2$ to 500 mg/m$^2$ per one-sided surface in terms of metal Ni.

4. The Ni-plated steel sheet according to claim 1 or 2, further comprising:
   a chemical conversion treatment film layer, which contains at least one of a chromium oxide, a zirconium compound, a phosphate compound, a titanium oxide, an aluminum oxide, and a manganese oxide, on the second Ni-plated layer.

5. The Ni-plated steel sheet according to claim 1 or 2, wherein the coating amount of Ni is 400 mg/m$^2$ to 1000 mg/m$^2$ per one-sided surface in terms of metal Ni.

6. The Ni-plated steel sheet according to claim 1 or 2, wherein the coating amount of Ni in the first Ni-plated layer is 300 mg/m$^2$ to 800 mg/m$^2$ per one-sided surface in terms of metal Ni, and
   the coating amount of Ni in the second Ni-plated layer is 100 mg/m$^2$ to 200 mg/m$^2$ per one-sided surface in terms of metal Ni.

7. The Ni-plated steel sheet according to claim 1 or 2, wherein a surface of the second Ni-plated layer has unevenness in which an average height difference in a thickness direction of the steel sheet is 1 μm to 10 μm.

8. A method for producing the Ni-plated steel sheet according to claim 1, comprising:
   a first plating process of subjecting a steel sheet to an electrolysis treatment in a first Ni-plating bath containing 5 g/L to 60g/L of Ni ions, 20 g/L to 300 g/L of sulfate ions, 10 g/L to 60 g/L of borate ions, and less than 0.5 g/L of chloride ions to form a first Ni-plated layer on the steel sheet; and
   a second plating process of subjecting the steel sheet, on which the first Ni-plated layer is formed, to an electrolysis treatment in a second Ni-plating bath containing 5 g/L to 60 g/L of Ni ions, 20 g/L to 300 g/L of sulfate ions, 10 g/L to 60 g/L of borate ions, and 10 g/L to 60 g/L of chloride ions to form a second Ni-plated layer on the first Ni-plated layer,
   wherein a temperature of the first Ni-plating bath and a temperature of the second Ni-plating bath are equal to or higher than 10° C. and lower than 90° C., and
   in the first plating process and the second plating process, the electrolysis treatment is performed at a current density of 1.0 A/dm$^2$ to 100 A/dm$^2$ for an electrolysis treatment time of 0.2 seconds to 150 seconds.

9. The method for producing the Ni-plated steel sheet according to claim 8,
   wherein a rinsing process is not provided between the first plating process and the second plating process.

* * * * *